US010745068B2

(12) United States Patent
Sewell et al.

(10) Patent No.: US 10,745,068 B2
(45) Date of Patent: Aug. 18, 2020

(54) ENDLESS TRACK AND GUIDE MEMBER

(71) Applicant: The Charles Machine Works, Inc., Perry, OK (US)

(72) Inventors: Cody L. Sewell, Perry, OK (US); Brant Douglas Kukuk, Perry, OK (US)

(73) Assignee: The Charles Machine Works, Inc., Perry, OK (US)

(*) Notice: Subject to any disclaimer, the term of this patent is extended or adjusted under 35 U.S.C. 154(b) by 0 days.

(21) Appl. No.: 16/150,886

(22) Filed: Oct. 3, 2018

(65) Prior Publication Data
US 2019/0031256 A1    Jan. 31, 2019

Related U.S. Application Data

(63) Continuation of application No. 15/425,519, filed on Feb. 6, 2017, now Pat. No. 10,099,733.
(Continued)

(51) Int. Cl.
*B62D 55/065* (2006.01)
*B62D 55/084* (2006.01)
(Continued)

(52) U.S. Cl.
CPC ......... *B62D 55/084* (2013.01); *B62D 55/065* (2013.01); *B62D 55/0847* (2013.01);
(Continued)

(58) Field of Classification Search
CPC ........ B62D 55/02; B62D 55/04; B62D 55/08; B62D 55/084; B62D 55/104;
(Continued)

(56) References Cited

U.S. PATENT DOCUMENTS 1,660,100 A * 2/1928 Smyth ................... B62D 55/08
                                                              305/139
1,804,816 A    5/1931 Shelton
(Continued)

FOREIGN PATENT DOCUMENTS

CA    2509440 A1    12/2005
DE     329220 A     11/1920
(Continued)

*Primary Examiner* — Jacob D Knutson
*Assistant Examiner* — Maurice L Williams
(74) *Attorney, Agent, or Firm* — Tomlinson McKinstry, P.C.

(57) ABSTRACT

A track assembly is formed from an endless track, an elongate guide member, a drive sprocket, and a plurality of track engaging rollers. The endless track has an inner surface having a plurality of parallel circumferential ridges. Formed between the circumferential ridges is a circumferential channel. The guide member is at least partially positioned and closely received within the circumferential channel. The track engaging rollers are arranged in a pair of parallel rows near an outer side of each circumferential ridge. During track rotation, the guide member remains closely received within the channel, and the rollers contact the outer side of the ridges to resist lateral movement of the track. Positioning of the guide member in the circumferential channel, with the rollers outside the ridges, laterally stabilizes the track thereby reducing the risk of the track slipping off the track assembly.

26 Claims, 18 Drawing Sheets

Related U.S. Application Data

(60) Provisional application No. 62/291,603, filed on Feb. 5, 2016.

(51) Int. Cl.
    *B62D 55/22* (2006.01)
    *B62D 55/10* (2006.01)
    *B62D 55/12* (2006.01)
    *B62D 55/14* (2006.01)
    *B62D 55/24* (2006.01)

(52) U.S. Cl.
    CPC ............ *B62D 55/10* (2013.01); *B62D 55/14* (2013.01); *B62D 55/22* (2013.01); *B62D 55/244* (2013.01); *B62D 55/12* (2013.01)

(58) Field of Classification Search
    CPC .. B62D 55/108; B62D 55/244; B62D 55/065; B62D 55/0847; B62D 55/10; B62D 55/12; B62D 55/14
    See application file for complete search history.

(56) References Cited

U.S. PATENT DOCUMENTS

| | | |
|---|---|---|
| 1,815,839 A | 7/1931 | Ferguson |
| 1,862,329 A | 6/1932 | Carden |
| 2,277,855 A | 3/1942 | Mercier |
| 3,082,637 A | 3/1963 | Paxton |
| 3,265,146 A | 8/1966 | Tucker |
| 3,583,509 A | 6/1971 | Stachnik |
| 3,730,287 A | 5/1973 | Fletcher |
| 3,787,099 A * | 1/1974 | Tucker ................. B62D 55/065 305/135 |
| 3,937,289 A | 2/1976 | Dickinson |
| 3,939,930 A * | 2/1976 | Firstenberg ............ B62D 55/04 180/9.21 |
| 3,946,822 A | 3/1976 | Dohse et al. |
| 4,072,203 A | 2/1978 | Pierson |
| 4,361,363 A | 11/1982 | Livesay |
| 4,454,925 A | 6/1984 | Oswald |
| 4,579,182 A | 4/1986 | Dewing |
| 4,953,919 A | 9/1990 | Langford |
| 4,966,242 A | 10/1990 | Baillargeon |
| 5,343,960 A | 9/1994 | Gilbert |
| 5,388,656 A * | 2/1995 | Lagasse ............ B62D 49/0635 180/9.21 |
| 5,607,210 A | 3/1997 | Brazier |
| 5,924,503 A | 7/1999 | Lykken |
| 6,132,133 A | 10/2000 | Muro et al. |
| 6,135,220 A | 10/2000 | Gleasman |
| 6,199,646 B1 | 3/2001 | Tani |
| 6,213,490 B1 | 4/2001 | Lykken |
| 6,374,933 B1 | 4/2002 | Ruppert, Jr. |
| 6,497,460 B2 | 12/2002 | Lemke |
| 6,601,664 B2 | 8/2003 | Hiraki et al. |
| 6,869,153 B2 | 3/2005 | Wright et al. |
| 7,108,333 B1 | 9/2006 | Kirchenwitz et al. |
| 7,222,924 B2 | 5/2007 | Christianson |
| 7,708,092 B2 | 5/2010 | Despres |
| 8,430,188 B2 | 4/2013 | Hansen |
| 8,851,209 B2 | 10/2014 | Fukumoto |
| 8,991,541 B1 * | 3/2015 | Maier ................. A63C 5/08 180/181 |
| 9,511,805 B2 | 12/2016 | Lajoie et al. |
| 9,586,634 B2 | 3/2017 | Buchanan et al. |
| 2004/0140138 A1 | 7/2004 | Brazier |
| 2005/0145422 A1 | 7/2005 | Loegering et al. |
| 2006/0060395 A1 | 3/2006 | Boivin |
| 2007/0240917 A1 | 10/2007 | Duceppe |
| 2010/0012399 A1 | 1/2010 | Hansen |
| 2010/0139994 A1 | 6/2010 | Hansen |
| 2012/0217071 A1 | 8/2012 | Fukumoto et al. |
| 2012/0299371 A1 * | 11/2012 | Simula ................. B62D 55/02 305/124 |
| 2012/0305025 A1 | 12/2012 | Helbig et al. |
| 2014/0182960 A1 * | 7/2014 | Bedard ................. B62M 27/02 180/190 |
| 2015/0129329 A1 | 5/2015 | Cox |
| 2015/0183464 A1 * | 7/2015 | Mannering ............ B62D 11/20 180/9.46 |
| 2016/0368549 A1 | 12/2016 | Davis et al. |

FOREIGN PATENT DOCUMENTS

| | | | |
|---|---|---|---|
| DE | 20000737 U1 | 4/2000 | |
| DE | 20015204 U1 | 1/2001 | |
| FR | 1515402 | 3/1968 | |
| GB | 124450 A | 4/1919 | |
| GB | 127329 A | 6/1919 | |
| GB | 277062 A * | 9/1927 | ............ B62D 55/02 |
| GB | 925032 A | 5/1963 | |
| GB | 2159112 A | 11/1985 | |
| NL | 19248 C | 7/1923 | |
| WO | 2006066406 A1 | 6/2006 | |

* cited by examiner

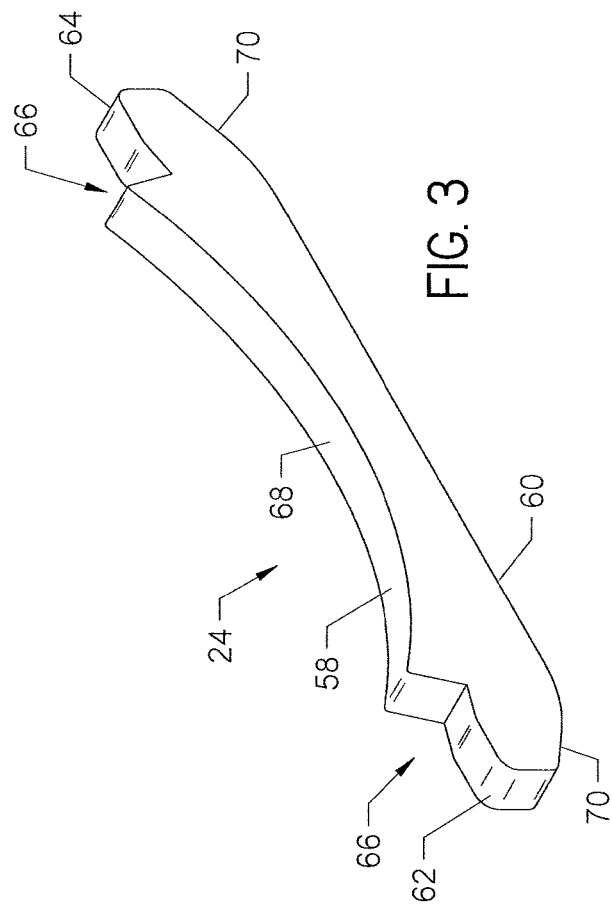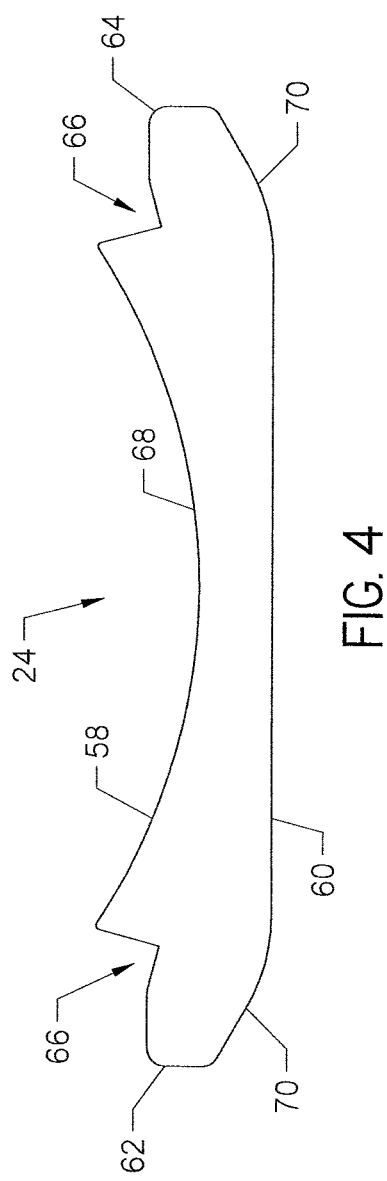

ENDLESS TRACK AND GUIDE MEMBER

FIELD

The present invention relates to track assemblies and more particularly to endless tracks and guide members for such track assemblies.

SUMMARY

The invention is directed to a flexible, endless track having an inner surface. Formed on the inner surface are a plurality of circumferential ridges. The circumferential ridges are situated in parallel relationship such that a circumferential channel is formed between an adjacent pair of the ridges.

A track assembly is formed from the endless track, a rotatable drive sprocket, and an elongate guide member. The endless track is supported on the drive sprocket, and the guide member is at least partially situated within the channel of the endless track.

A tracked vehicle is formed from a plurality of the track assemblies, a chassis, and an engine supported by the chassis. The track assemblies are configured to support the chassis while engaging the ground.

BRIEF DESCRIPTION OF THE DRAWINGS

FIG. 3 is a perspective view of a guide member of the track assembly of FIG. 1.

FIG. 4 is a side elevation view of the guide member of FIG. 3.

DETAILED DESCRIPTION

Tracked vehicles are often used to travel across difficult surface conditions such as mud, sand, snow, rugged terrain, or unstable ground. In such conditions, tracked vehicles are advantageous because tracks tend to spread the weight of the vehicle out across a broad surface area. Spreading the weight of the vehicle out using tracks increases traction while decreasing the likelihood that ruts or other surface damage will occur. For these reasons tracked vehicles have been popular in the agricultural and construction industries where large vehicles weighing several thousand pounds are often used. However, operating heavy vehicles on uneven terrain may cause the track assemblies to be tilted such that the endless tracks slip off the track assemblies. Thus it is desirable to provide tools and methods for maintaining the lateral position of the track on the track assembly.

Figure 18:
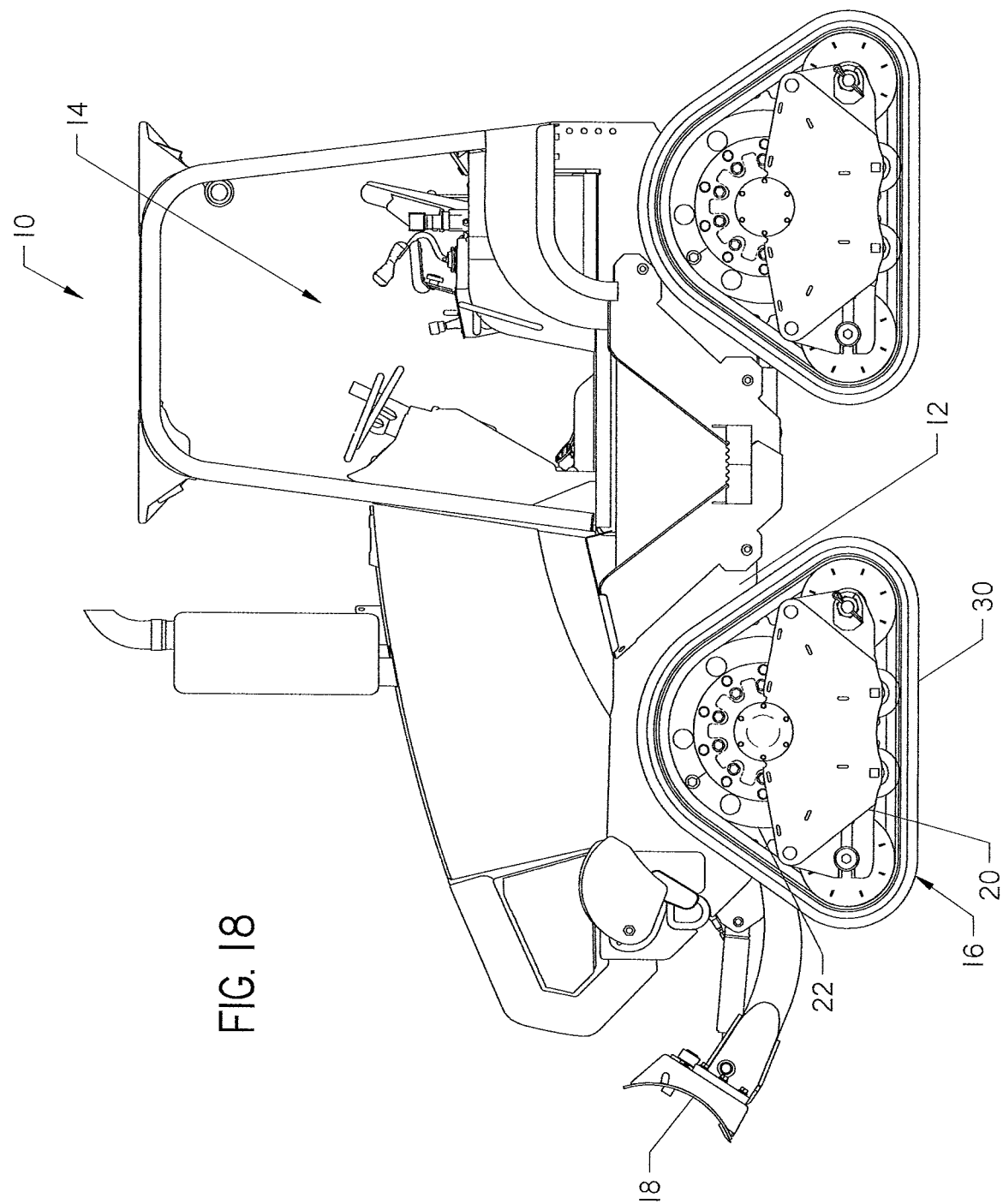
FIG. 18 is a vehicle having a chassis supported by a plurality of the track assemblies of FIG. 1.
Figure 19:
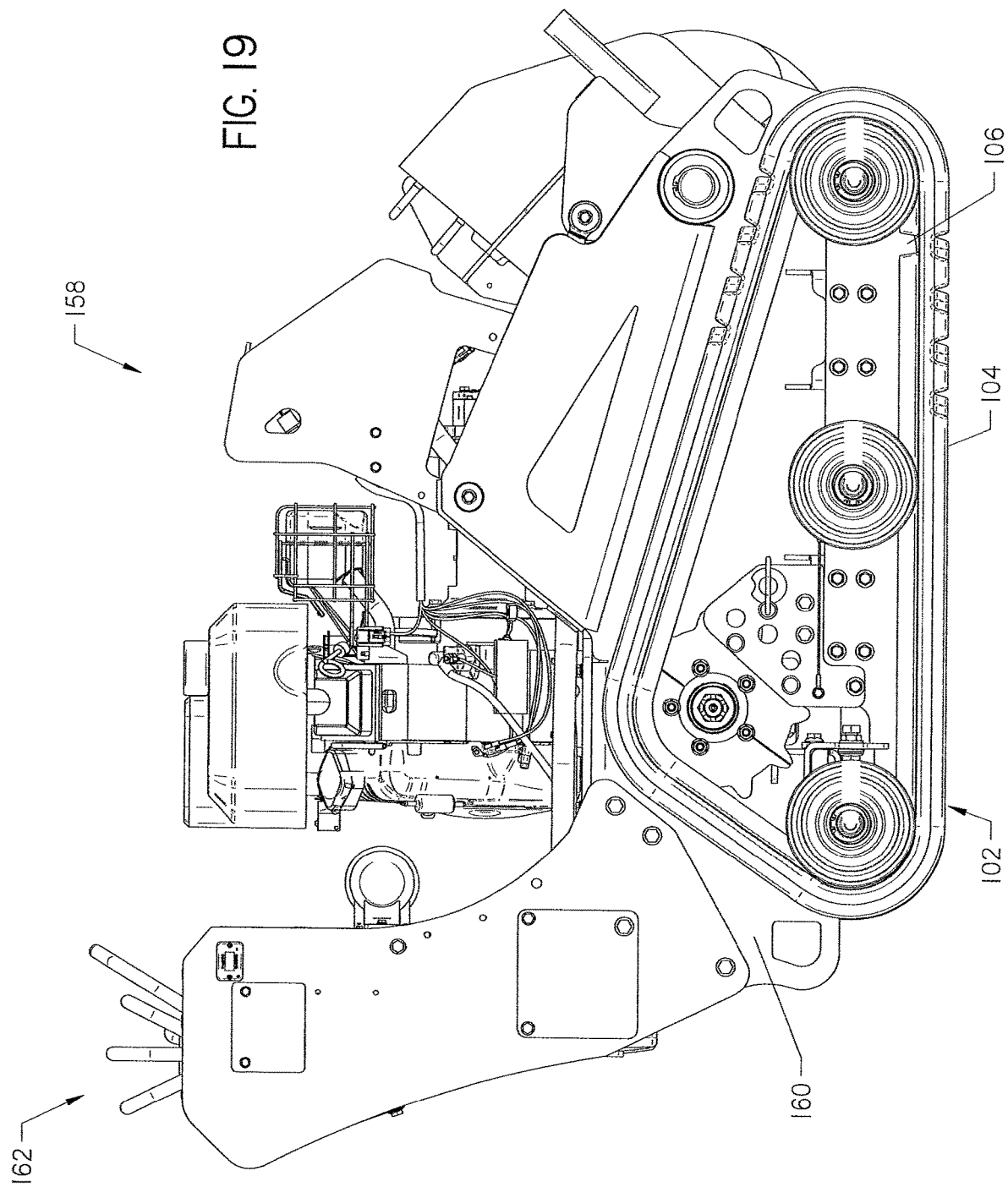
FIG. 19 is a vehicle having a chassis supported by a plurality of the track assemblies of FIG. 11.

Said tracked vehicles have several configurations and uses. For example, as shown in FIG. 19, a standard skid-steer vehicle having two track assemblies is shown. While the track assemblies shown in FIG. 19 are generally triangular, these may also be configured as an oval. Such two-track configurations "skid-steer" by changing the relative velocity of each track—turning left, for example, by rotating the left track forward faster than the right track is rotated. As shown in FIG. 18, four track frames may alternatively be used. Such a configuration may "skid-steer", or may have a steerable axle. Additionally, track frames may be utilized in conjunction with other ground engaging members, such as wheels. In any case, the type of vehicle and the number or configuration of track frames is not limiting on the invention. The present invention may be utilized with any such track frame.

Figure 1:
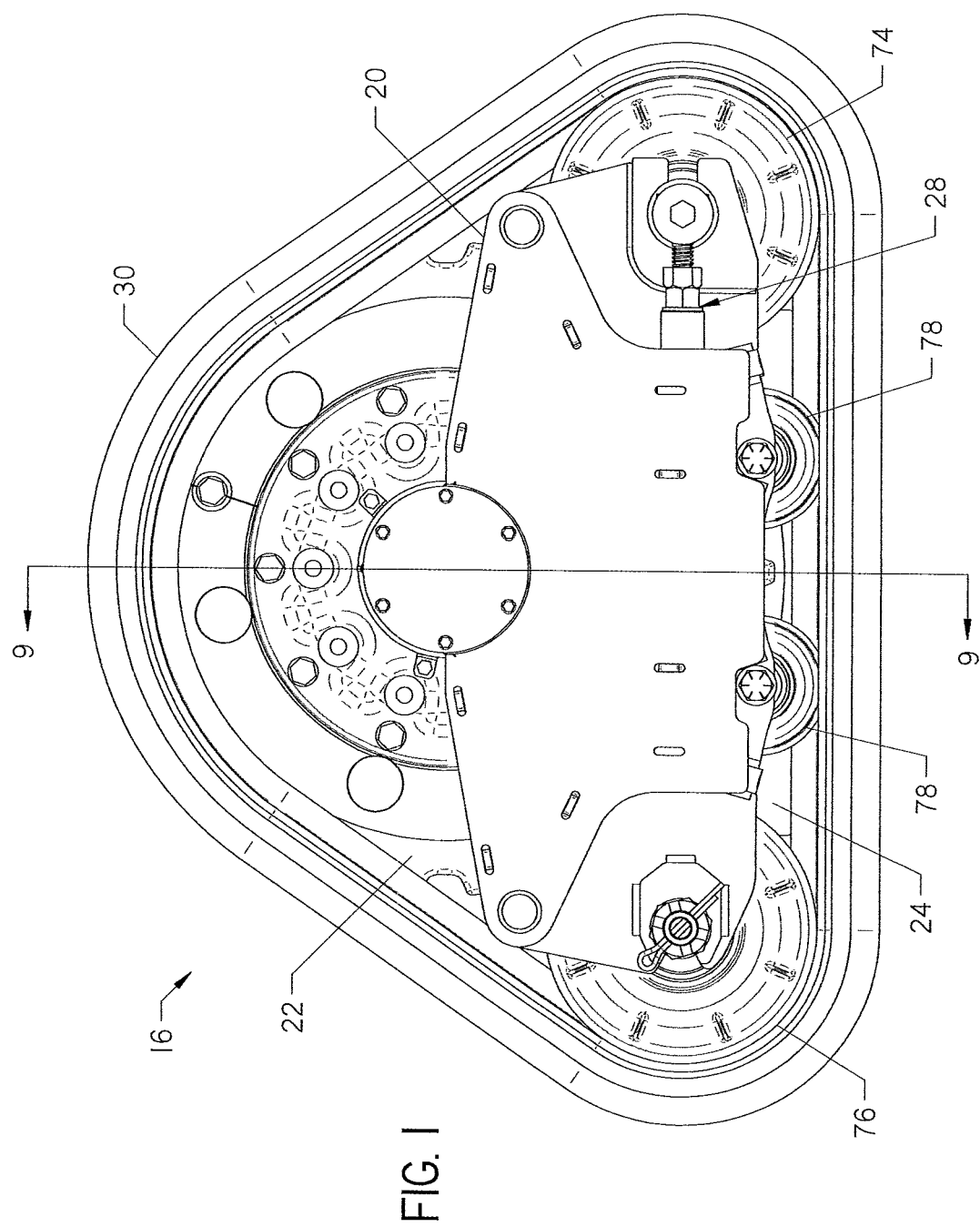
FIG. 1 is a side elevation view of a track assembly.

With reference to FIG. 18, a tracked vehicle 10 for driving over difficult terrain conditions is shown. The tracked vehicle 10 comprises a chassis 12, an engine (not shown) that is supported on the chassis 12, an operator station 14, and a plurality of track assemblies 16. The chassis 12 may support a work tool 18, such as a backfill blade, or attachments such as a trencher, plow, or earth saw. The track assemblies 16 engage the ground and support the chassis 12. With reference to FIG. 1, each track assembly 16 comprises a frame 20, a drive sprocket 22, a guide member 24, a plurality of track-engaging rollers 74, 76, 78, a plurality of track tensioning assemblies 28, and an endless track 30.

In FIG. 18, the tracked vehicle 10 is supported on a plurality of the track assemblies 16 of FIG. 1. The vehicle 10 preferably has four track assemblies 16 that function similarly to traditional wheels. An operator controls the power from the engine to rotate the drive axles and the connected drive sprockets 22 and tracks 30. Moving the tracks 30 in a first direction causes the vehicle 10 to drive forward, and moving the tracks 30 in a second direction causes the vehicle 10 to drive in reverse. Each track assembly 16 may pivot about a vertical steering axis to allow the operator to change direction of the vehicle 10 as it travels over the ground. The vehicle 10 may be steered by the operator using the steering wheel to turn the track assemblies 16 at the front of the vehicle 10. In another embodiment, the vehicle 10 may be equipped with four-track steering such that operation of the steering wheel causes all four track assemblies 16 to pivot about their respective axes to turn the vehicle 10. When turning or operating the vehicle 10 on uneven surfaces, lateral forces may be applied to the track assemblies 16.

Figure 11:
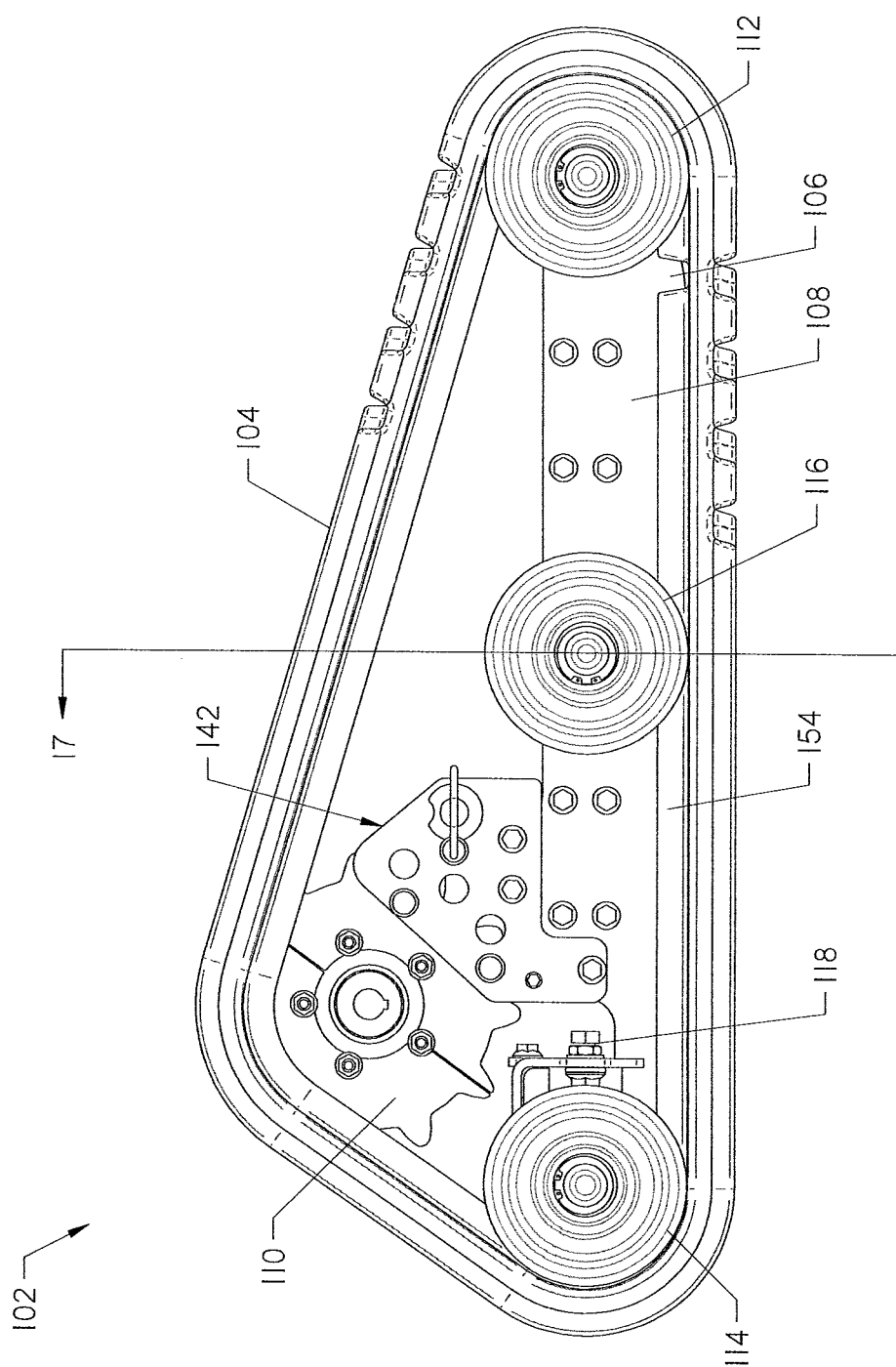
FIG. 11 is a side elevation view of a first side of another embodiment of a track assembly.
Figure 12:
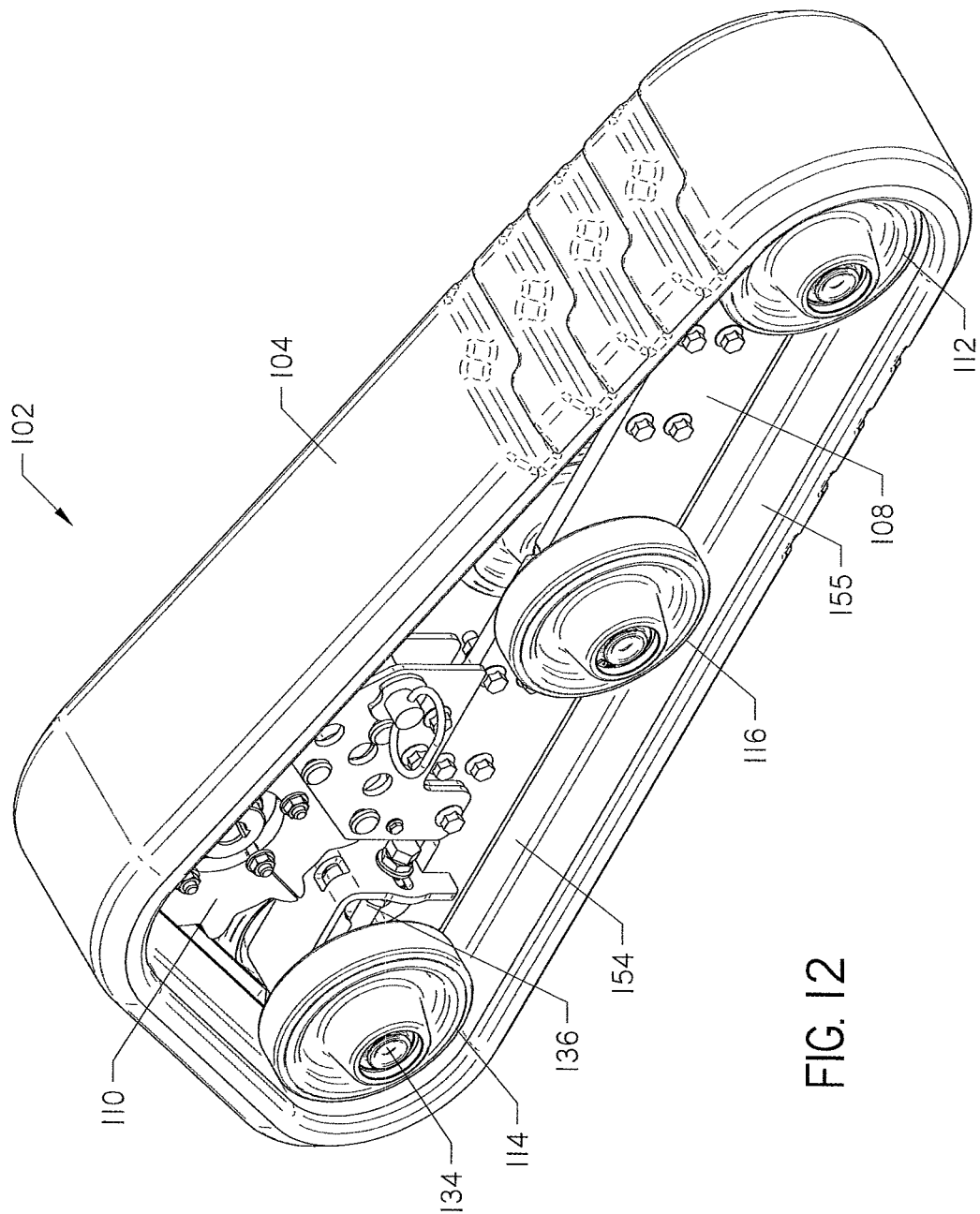
FIG. 12 is a perspective view of the first side of the track assembly of FIG. 11.
Figure 13:
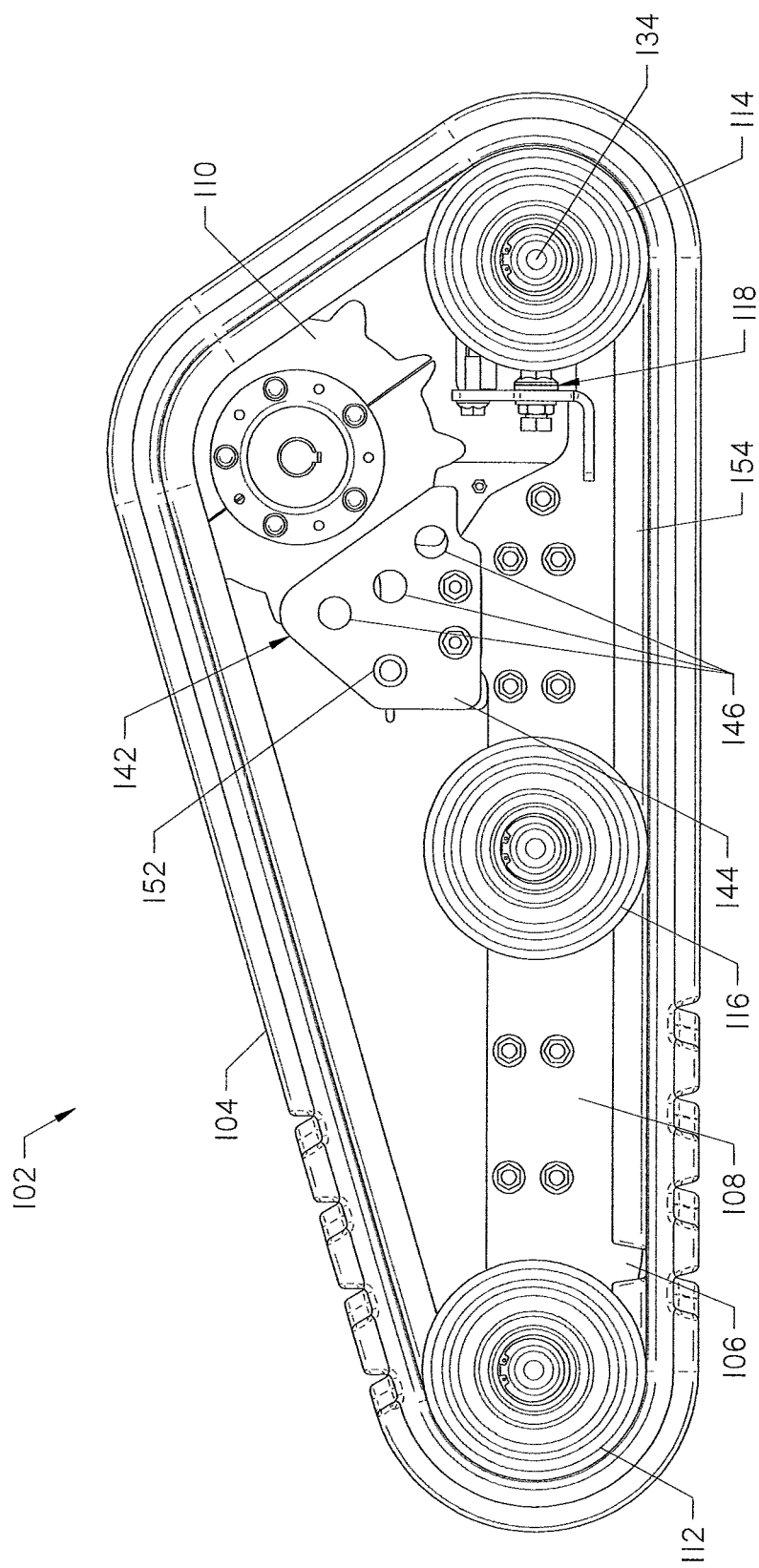
FIG. 13 is a side elevation view of a second side of the track assembly of FIG. 11.
Figure 14:
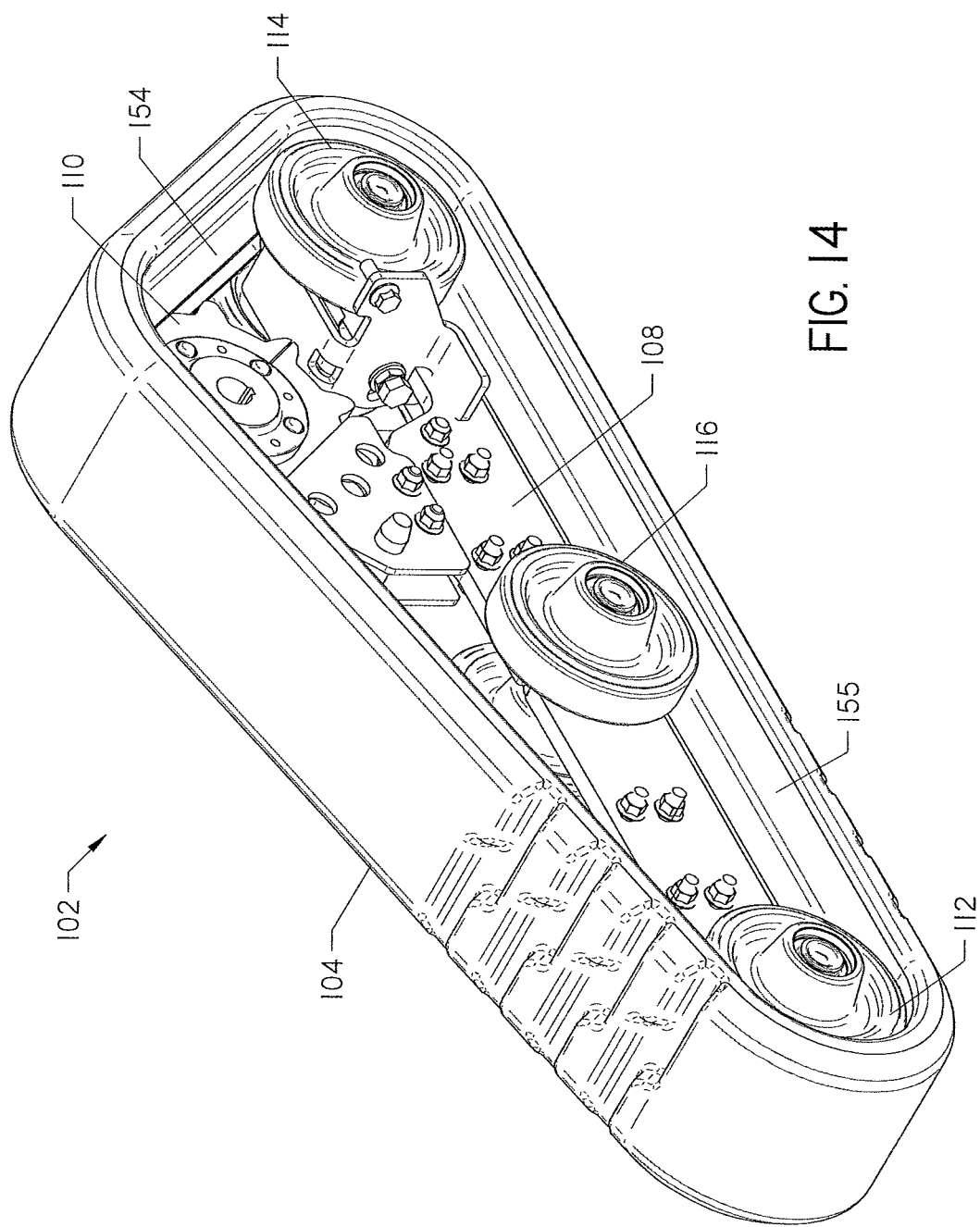
FIG. 14 is a perspective view of the second side of the track assembly of FIG. 11.

Shown in FIG. 19 is another embodiment of a tracked vehicle 158. The tracked vehicle 158 is supported on a plurality of track assemblies 102 of FIG. 11. Much as in the embodiment of FIG. 1, the tracked vehicle 158 comprises a chassis 160, an engine (not shown) that is supported on the chassis, an operator station 162, and the plurality of track assemblies 102. However, the tracked vehicle 158 has two track assemblies 102, rather than four. While the track assemblies 10, 158 shown in FIGS. 18 and 19 are generally triangular in shape, the track assemblies may have any suitable shape, including an oblong shape.

Turning to FIGS. 1 and 5-10, the frame 20 is formed from a strong and durable material such as steel. The frame 20 has an outboard side assembly 32 and an inboard side assembly 34. Each side assembly 32, 34 has a pair of spaced apart outer and inner plates 36, 38 arranged in parallel relationship. Preferably, the inner plate 38 of the outboard side assembly 32 is arranged in parallel relationship to the inner plate 38 of the inboard side assembly 34. The outer and inner plates 36, 38 are attached by a plurality of connectors 40 which may comprise struts. Likewise, the outer and inner side assemblies 32, 34 are attached to each other by a plurality of connectors 42, such as struts. On the lower side of the track assembly 16, a plurality of cross braces 44 extend between the side assemblies 32, 34.

Figure 5:
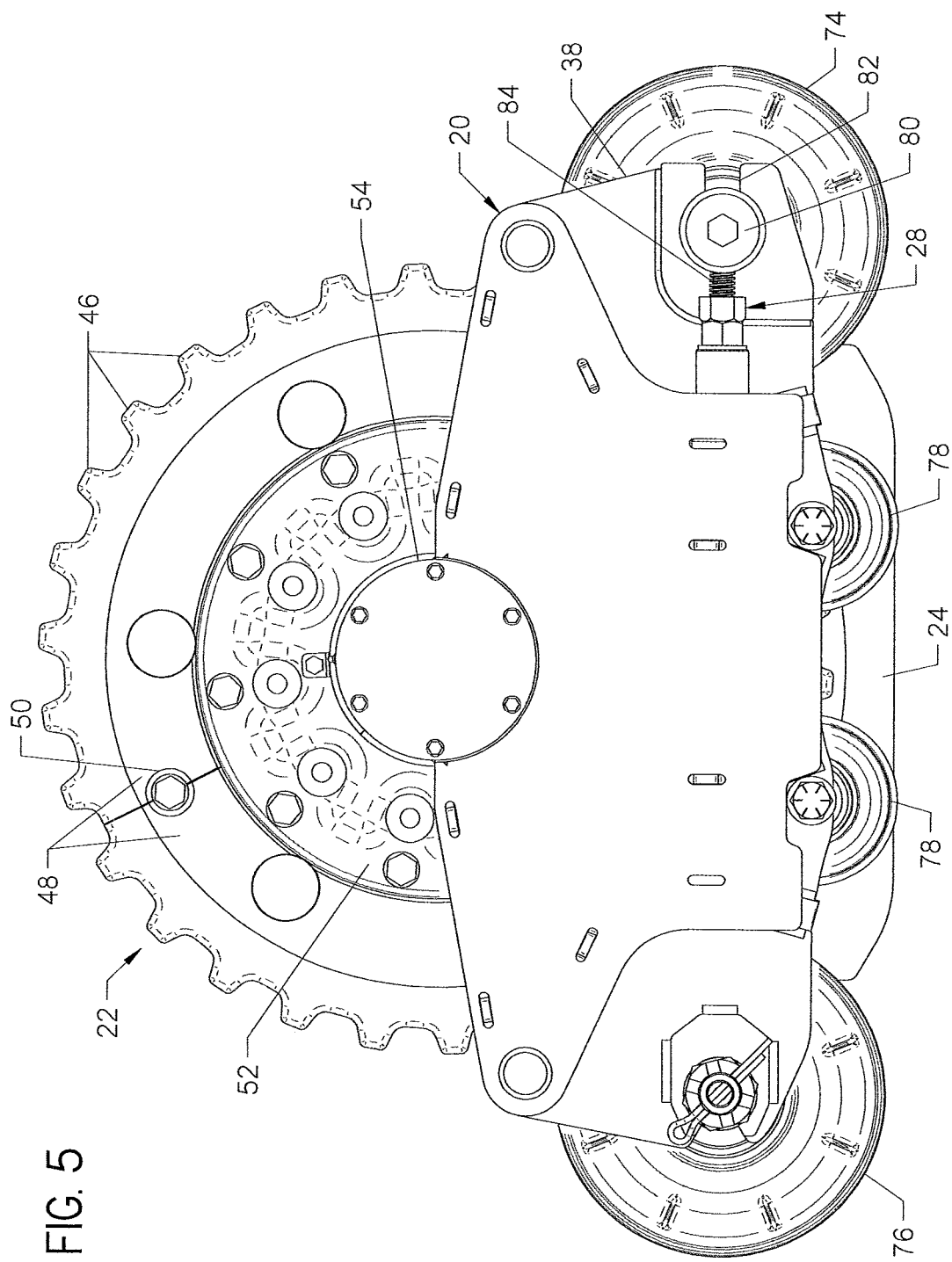
FIG. 5 is a side elevation view of a partial track assembly, showing the track assembly of FIG. 1 with the endless track removed.
Figure 6:
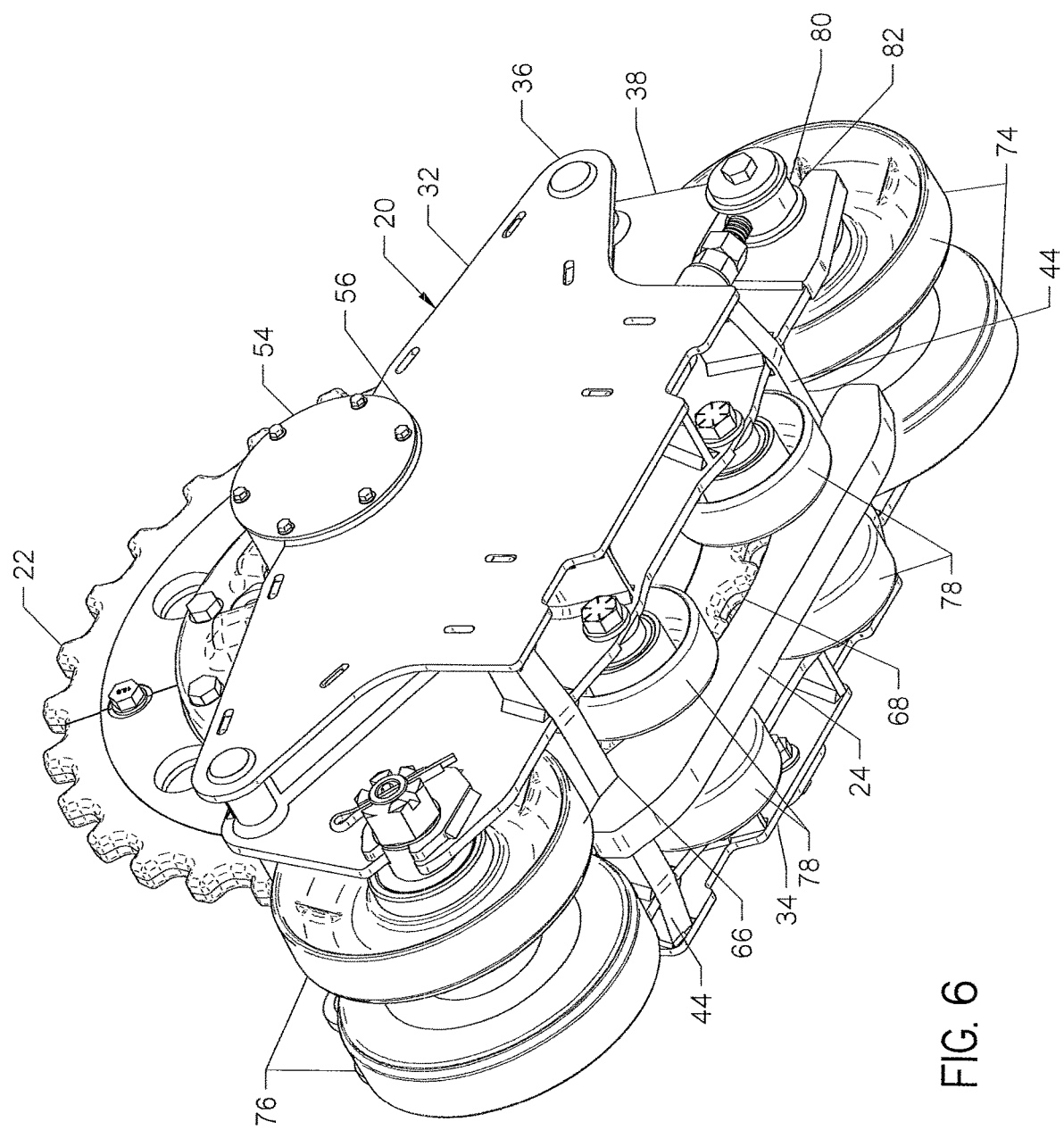
FIG. 6 is a perspective view of the assembly of FIG. 5.

The drive sprocket 22 is formed from a strong and durable material such as steel. Preferably, the drive sprocket 22 has the shape of a disc having a plurality of projections 46 extending radially outward. As shown in FIG. 5, the drive sprocket 22 comprises a plurality of curved sections 48 connected together by a plurality of connectors 50. The drive sprocket 22 may have a central track hub 52 which connects to a hub assembly 54. The hub assembly 54 transfers torque to the drive sprocket from a drive axle (not shown). Mounted on the hub assembly 54, the drive sprocket 22 is rotatable relative to the frame 20. As shown in FIGS. 6 and 8, the drive sprocket 22 is positioned between the outboard side assembly 32 and the inboard side assembly 34. The hub assembly 54 is at least partially situated within a concavity 56 formed in the outboard side assembly 32. In the embodiment of FIGS. 1-10, the drive sprocket 22 is generally centered between the longitudinal extremities of the frame 20.

Shown in FIGS. 3 and 4 is the guide member 24 of the track assembly 16 of FIG. 1. The guide member 24 is formed from a strong and durable material, such as steel. The guide member 24 is characterized by an elongate shape and has an upper surface 58, a lower surface 60, and opposed first and second ends 62, 64. In each end 62, 64, a notch 66 is formed. The upper surface 58 is characterized by a concavity 68 formed between the notches 66. The lower surface 60 has an upwardly curved portion 70 on each end 62, 64.

Figure 7:
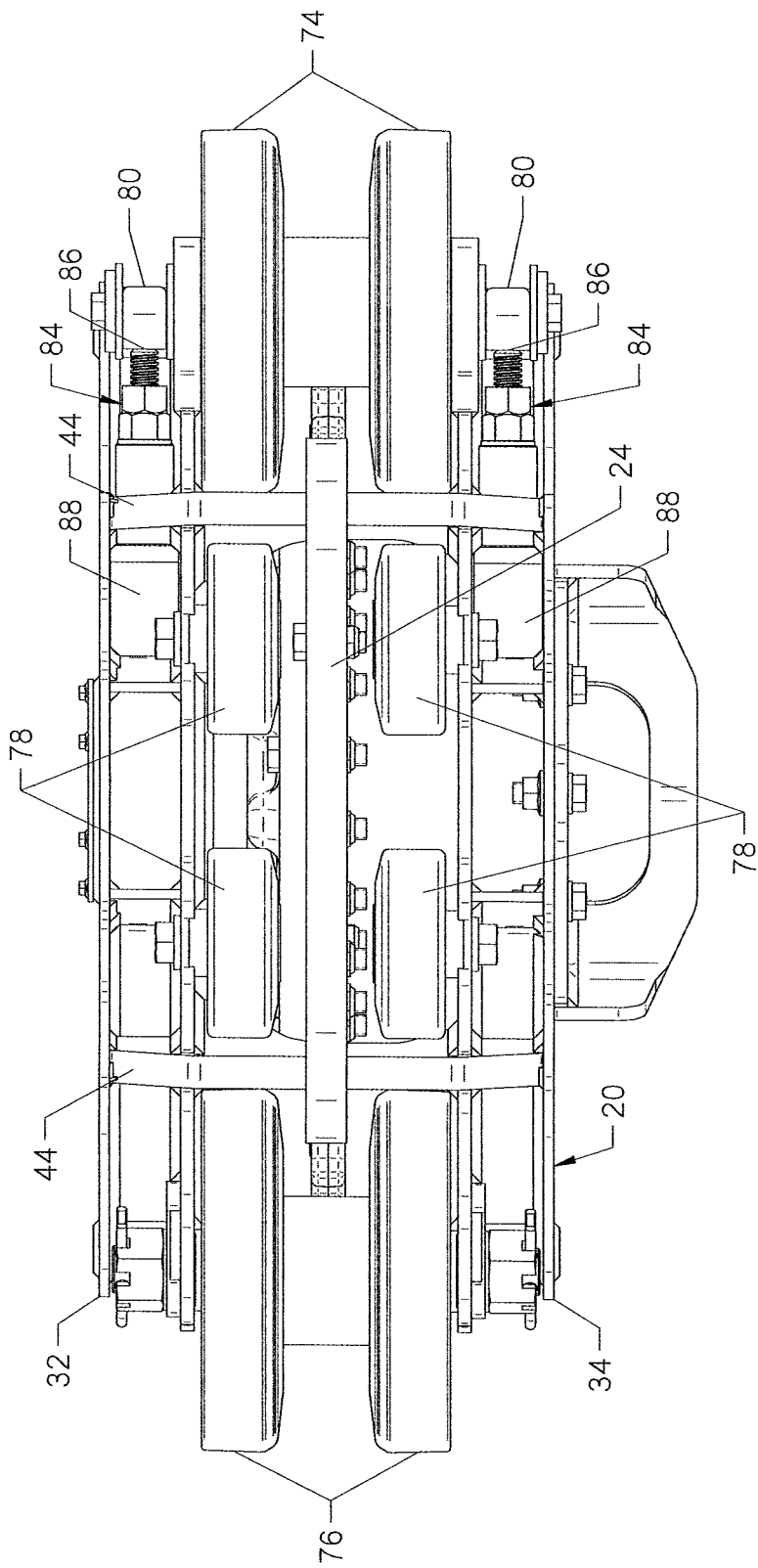
FIG. 7 is a bottom plan view of the assembly of FIG. 5.
Figure 8:
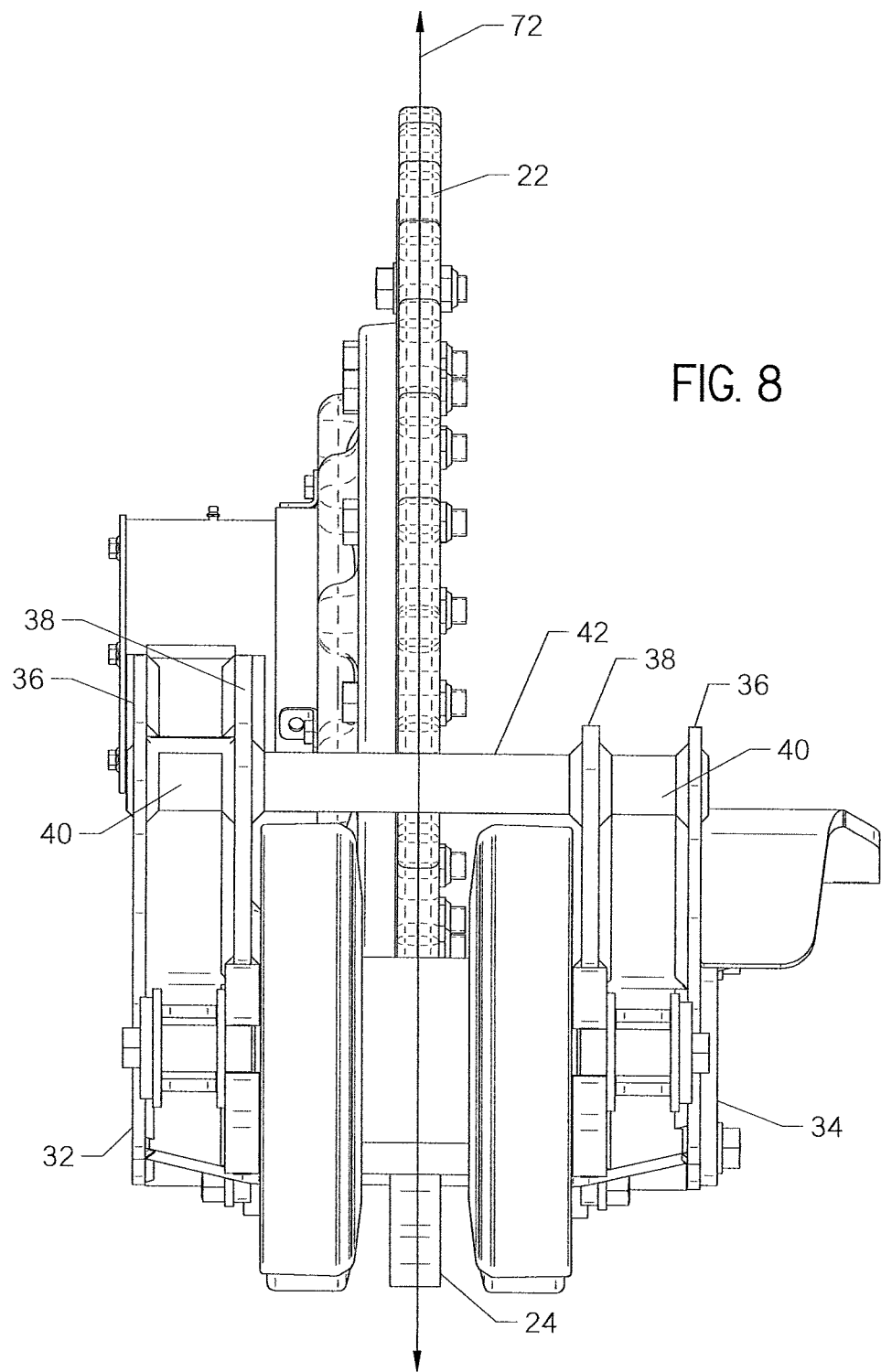
FIG. 8 is an end elevation view of the assembly of FIG. 5, showing a plane traversing a drive sprocket and the guide member.

As shown in FIGS. 6 and 7, the guide member 24 is supported by the plurality of cross braces 44 which are supported on the frame 20. The cross braces 44 extend transversely within the notches 66 formed in the guide member 24. The guide member 24 may be attached to the cross braces 44 by using a plurality of connectors, such as bolts, or by a fusion process, such as welding.

Figure 9:
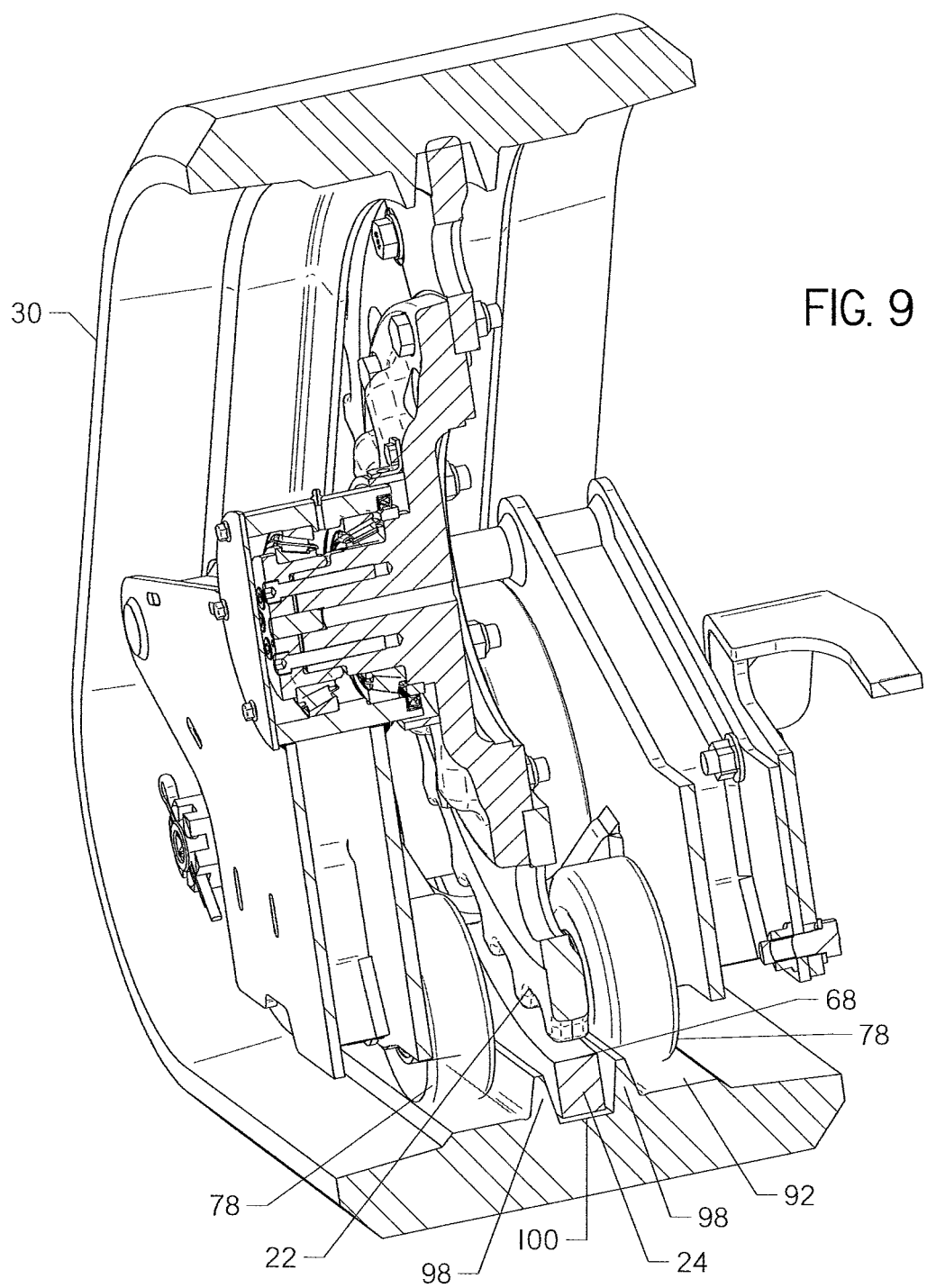
FIG. 9 is a cross-sectional perspective view of the track assembly of FIG. 1, taken along line 9-9, and showing the guide member positioned in a channel of the endless track.

As shown in FIG. 8, the guide member 24 may be situated beneath the drive sprocket 22 such that a single plane 72 longitudinally traverses both the drive sprocket 22 and the guide member 24. As best shown in FIGS. 6 and 9, the guide member 24 should be positioned such that at least a peripheral portion of the drive sprocket 22 resides within the concavity 68. Preferably, the shape of the concavity 68 conforms to the profile of the resident portion of the drive sprocket 22.

Shown in FIGS. 1 and 5-7, the plurality of rollers comprise a first end roller 74, a second end roller 76, and a plurality of bogie rollers 78 situated between the first and second end rollers 74,76. The rollers 74, 76, 78 are formed from a strong and durable material, such as steel. An axle 80 of the first end roller 74 is disposed within a slot 82 formed in the inner plate 38 of the side assemblies 32, 34. Positioning the axle 80 within the slot 82 allows the first end roller 74 to move relative to the frame 20 so that the track tension can be adjusted. The rollers 74, 76, 78 are supported on each of the side assemblies 32, 34 and are arranged in a pair of rows in parallel relationship. As shown in FIGS. 6 and 7, the guide member 24 is situated between the parallel rows of rollers 74, 76, 78.

A pair of the track tensioning assemblies 28 are supported on each side assembly 32, 34 of the frame 20. Each track tensioning assembly 28 may comprise a pivot arm or a linear actuator, such as a grease cylinder, a hydraulic cylinder, a pneumatic cylinder, or a jackscrew. As shown in FIGS. 5-7, each track tensioning assembly 28 comprises a jackscrew 84 having opposed first and second ends 86, 88. The first end 86 is attached to the axle 80 of the first end roller 74, and the second end 88 is attached to the frame 20. By extending or retracting the jackscrew 84, the distance between the first end roller 74 and the frame 20 is increased or decreased respectively. Increasing the distance adjusts the tension of the endless track 30 so that it fits more tightly around the drive sprocket 22 and rollers 74, 76, 78.

Figure 2:
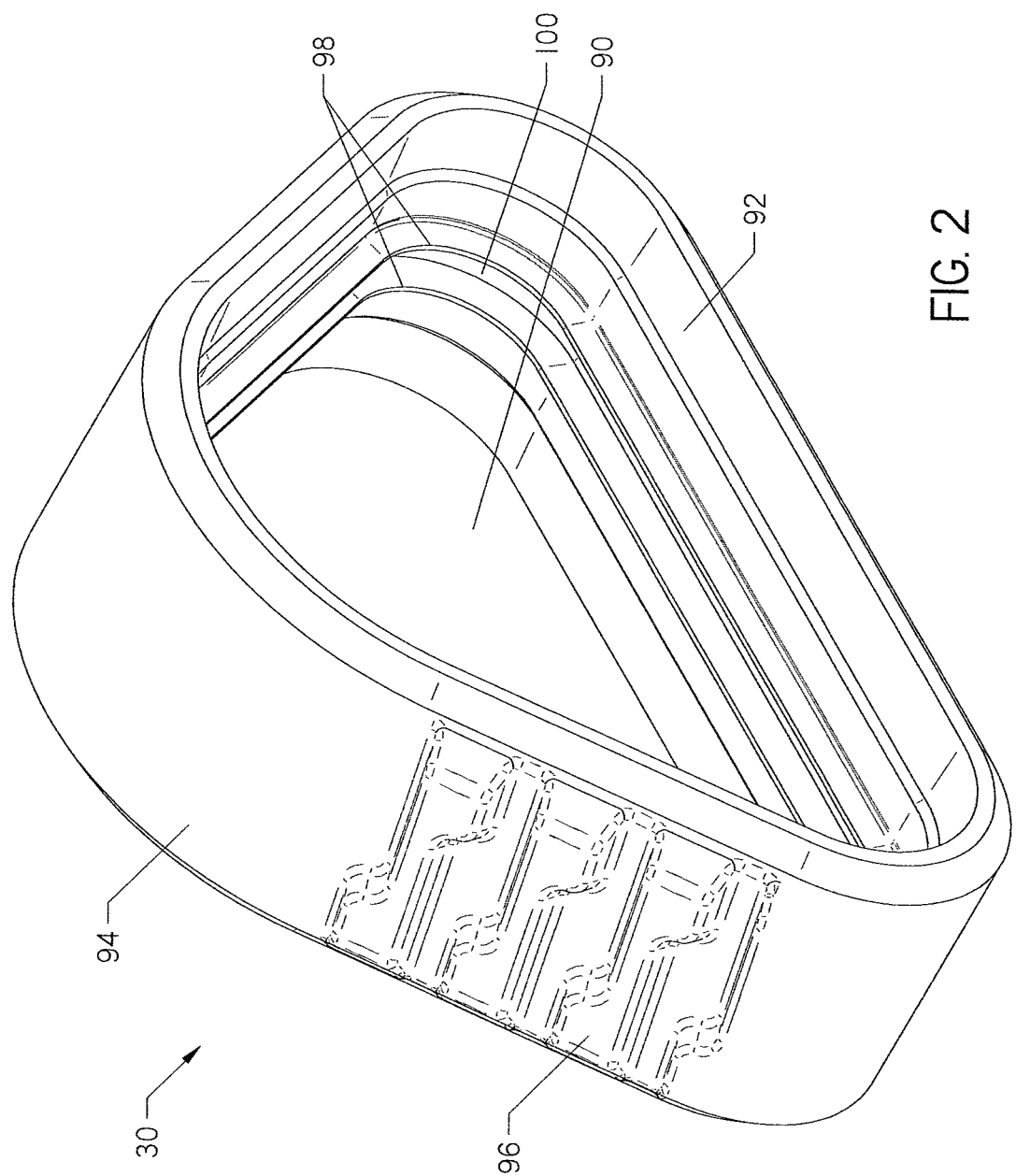
FIG. 2 is a perspective view of an endless track of the track assembly of FIG. 1.

Referring to FIG. 2, the endless track 30 is formed from a strong, durable, and flexible material, such as rubber. The track 30 forms a continuous loop surrounding an interior area 90. The track 30 has an inner surface 92 that bounds the interior area 90 and an outer surface 94 that contacts the ground. To provide improved traction, the outer surface 94 may be treaded. The treads may be characterized by a pattern of grooves 96 formed in at least a portion of the area where the track makes surface contact. Formed on the inner surface 92 are a plurality of circumferential ridges 98 in parallel relationship. A circumferential channel 100 is formed between an adjacent pair of circumferential ridges 98 and opens toward the interior area 90.

Figure 10:
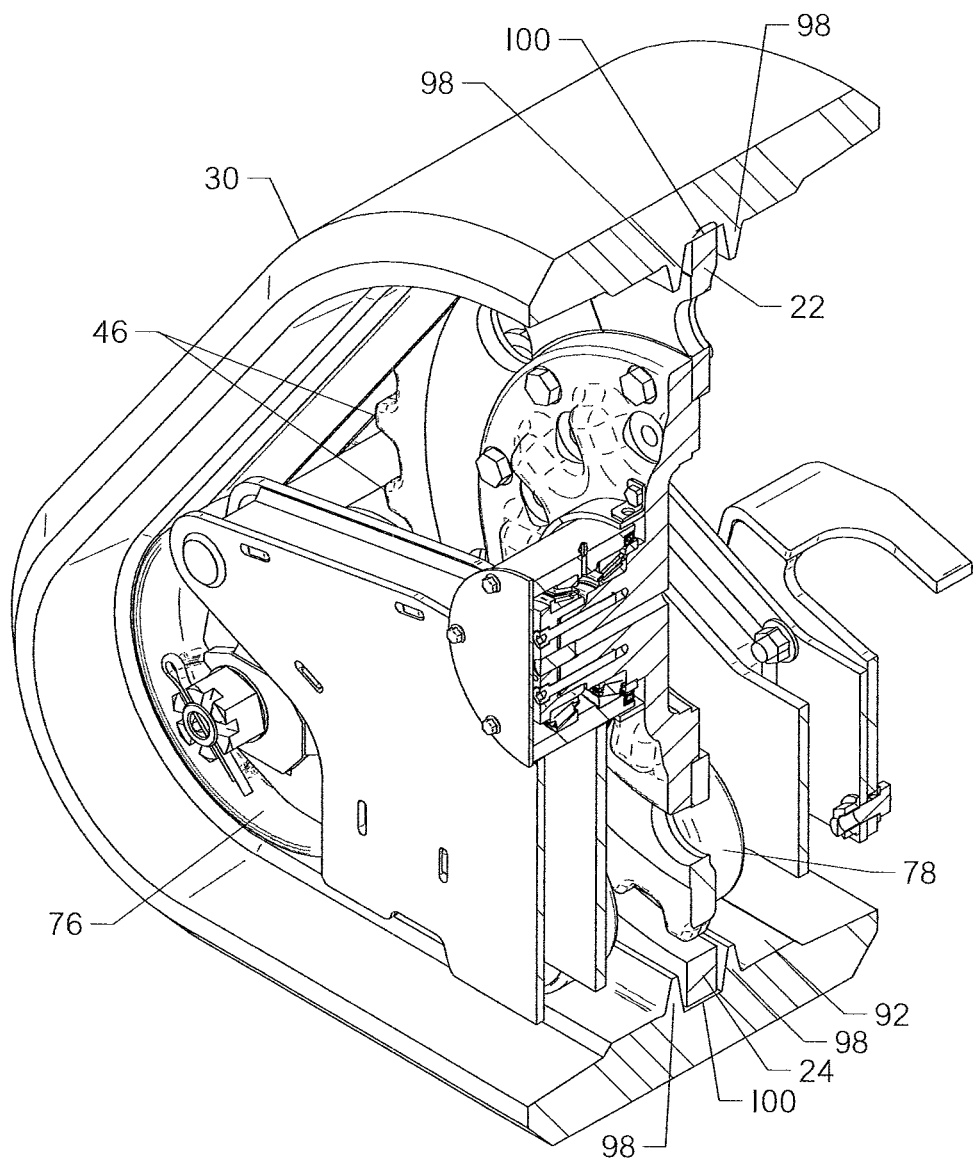
FIG. 10 is another cross-sectional perspective view of the track assembly of FIG. 1, taken along line 9-9, and showing the guide member positioned in the channel.

An assembled track assembly 16 is shown in FIGS. 1, 9, and 10. The track 30 is stretched around the drive sprocket 22 and the rollers 74, 76, 78. By using the pair of tensioning assemblies 28 to increase or decrease the distance between each first end roller 74 and the frame 20, the tension within the track 30 is adjusted. The track 30 is positioned such that the drive sprocket 22 and the rollers 74, 76, 78 contact the inner surface 92 of the track 30. As the drive sprocket 22 is rotated, the projections 46 of the drive sprocket 22 engage the inner surface 92 of the track 30 at the upper portion of its circuit causing the track 30 to travel around the drive sprocket 22 and rollers 74, 76, 78.

With reference to FIGS. 1-4, 9, and 10, the drive sprocket 22 and the guide member 24 are each partially situated within the channel 100 of the track 30. The guide member 24 has a width that closely fits within the channel 100. As the track 30 moves around its circuit, it passes each end 62, 64 of the guide member 24 while engaging the ground. Because the ends 62, 64 of the guide member 24 curve upwardly, friction between the guide member 24 and track 30 is minimized. As the track 30 moves, the guide member 24 remains positioned within the track's internal channel 100, thus biasing the track 30 against lateral movement that might result in its slipping off the rollers 74, 76, 78. Any lateral movement of the track assemblies 16 is further deflected by the rollers 74, 76, 78 that are positioned near the ridges 98 forming the channel 100 that surrounds the guide member 24.

Figure 15:
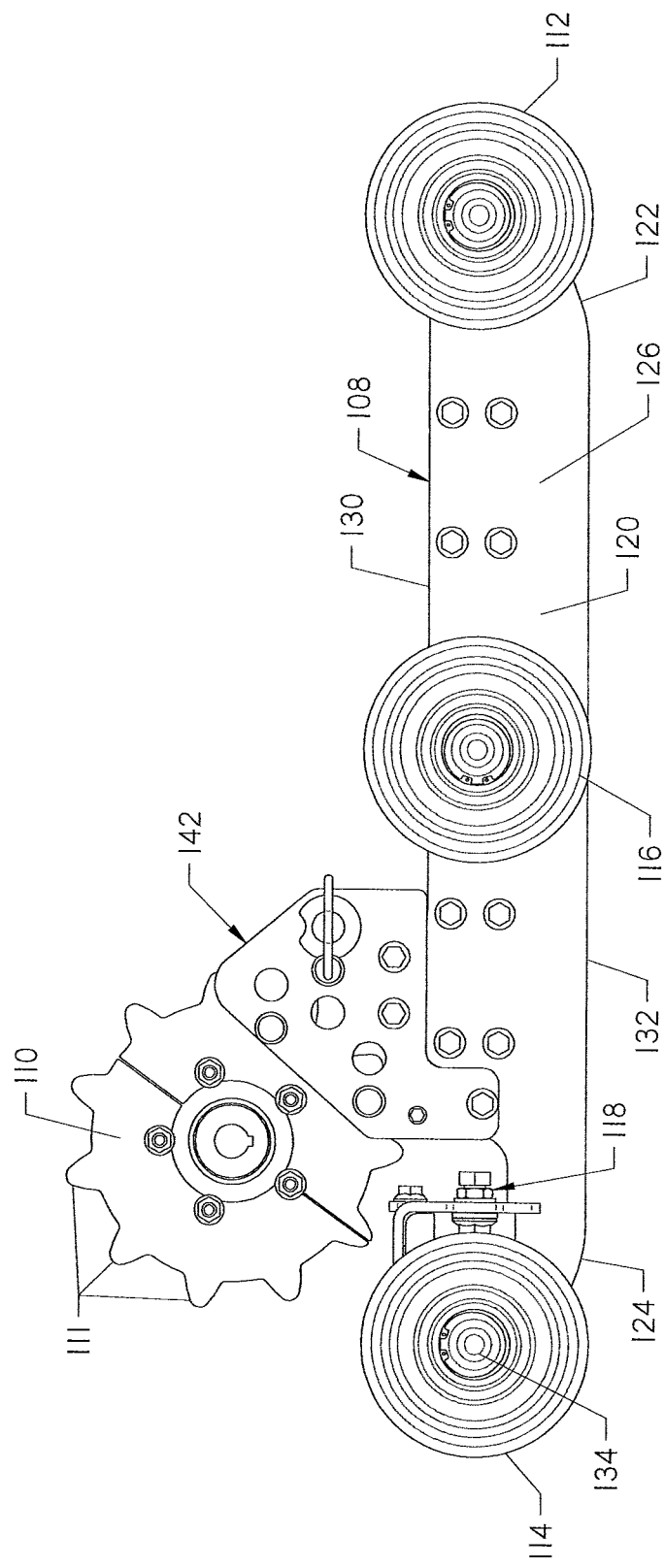
FIG. 15 is a side elevation view of a partial track assembly, showing the track assembly of FIG. 11 with the track removed.
Figure 16:
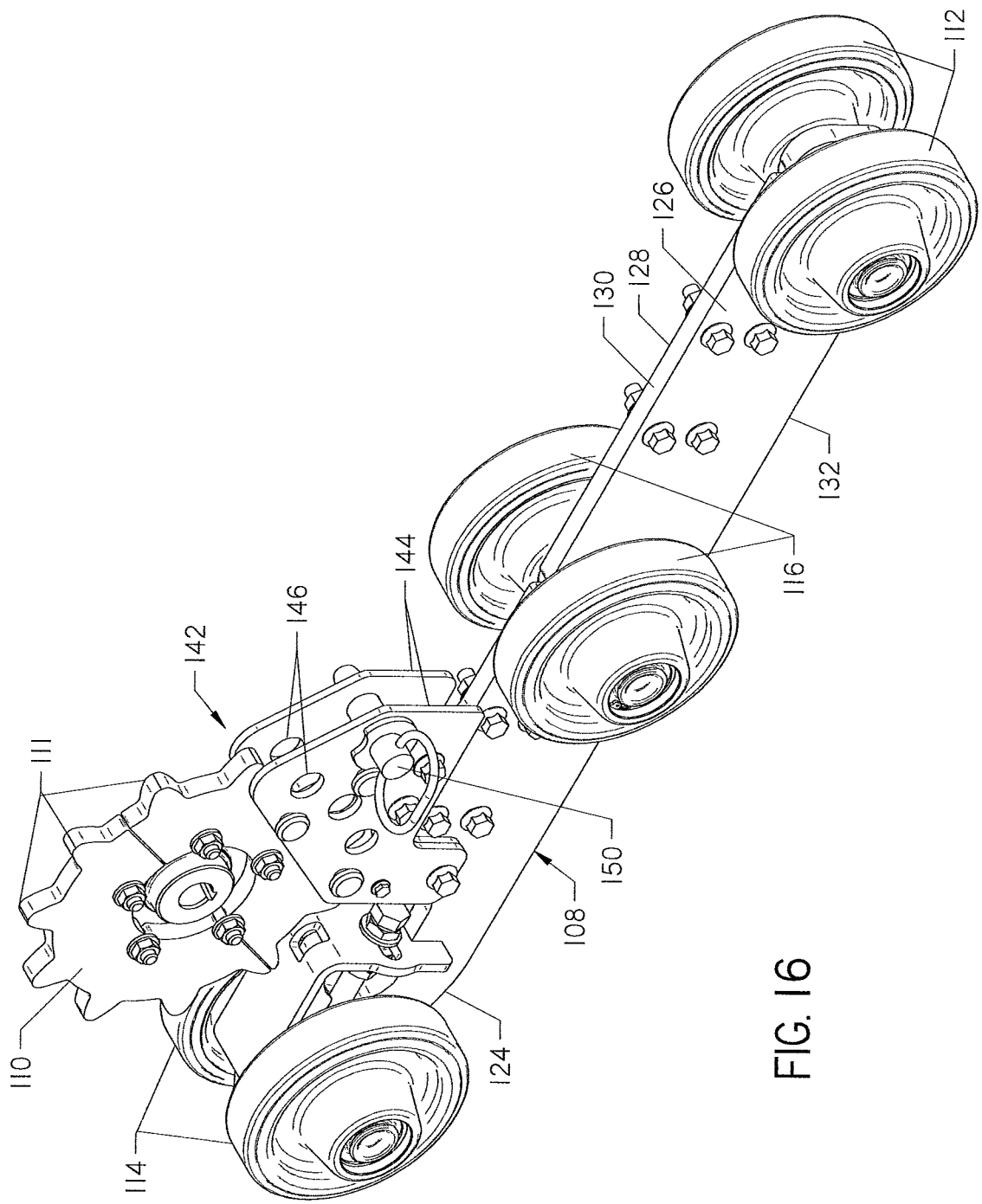
FIG. 16 is a perspective view of the partial track assembly of FIG. 15.
Figure 17:
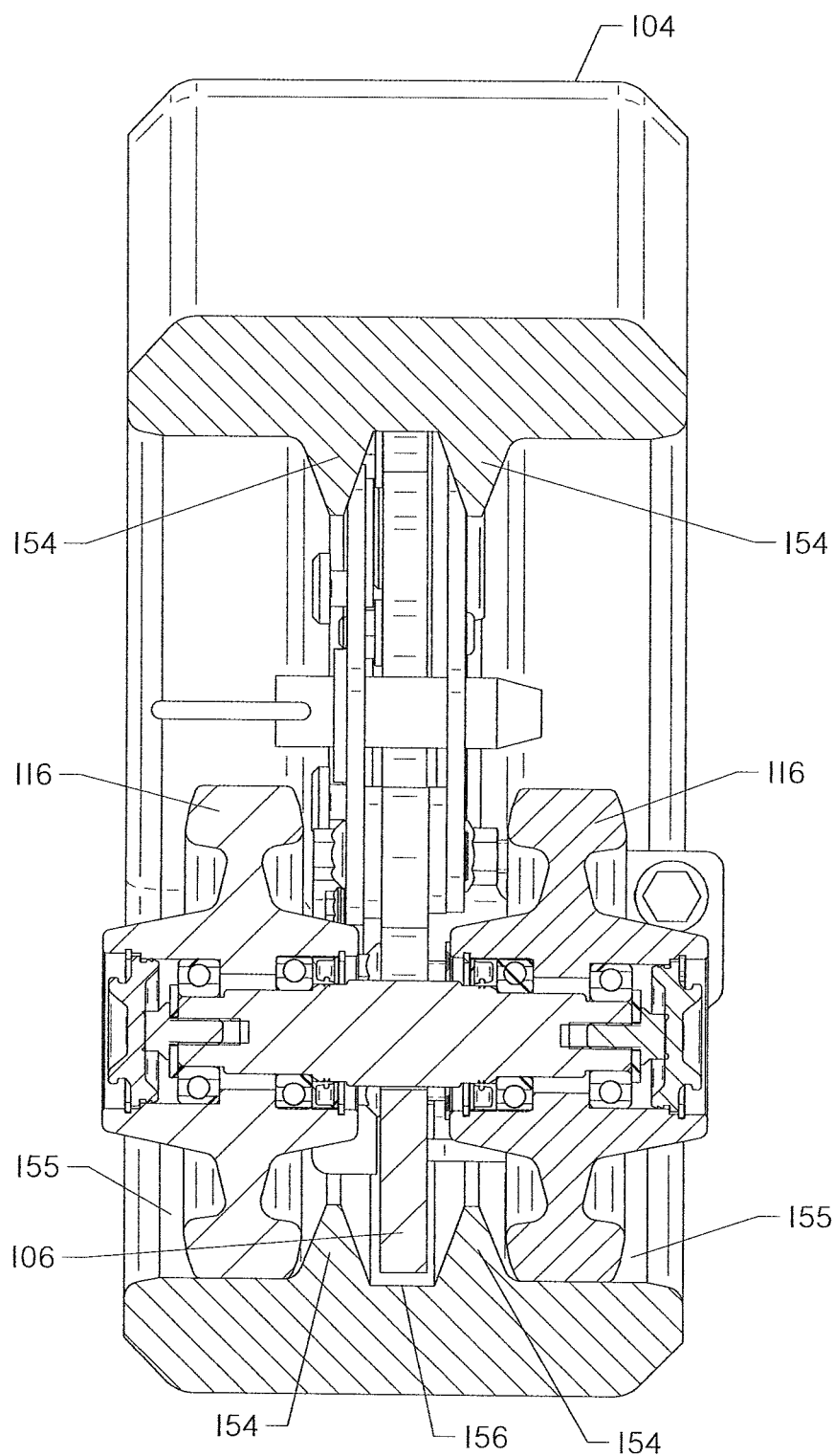
FIG. 17 is a cross-sectional view of the track assembly of FIG. 11, taken along line 17-17, and showing a frame having a guide member positioned in a channel of an endless track.

FIGS. 11-17 and 19 show another embodiment of the track assembly 102 having an endless track 104 and a guide member 106. The track assembly 102 comprises a frame 108, a drive sprocket 110, a plurality of track-engaging rollers 112, 114, 116, a track tensioning assembly 118, and the endless track 104. Rather than having a separate guide member, the guide member 106 is incorporated into the frame 108 in this embodiment. Referring to FIGS. 15 and 16, the frame 108 has an elongate body 120 having opposed first and second ends 122, 124, a first side 126, a second side 128, an upper surface 130, and a lower surface 132. As best shown in FIG. 15, the lower surface 132 curves upwardly at the first and second ends 122, 124. Situated near the second end 124 of the frame 108, the drive sprocket 110 has a plurality of projections 111.

The plurality of rollers comprise a pair of first end rollers 112, a pair of second end rollers 114, and at least one pair of bogie rollers 116. Situated on each side of the frame 108, the rollers 112, 114, 116 are arranged in a pair of rows in parallel relationship. The pair of second end rollers 112 are mounted on an axle 134 near the second end 124 of the frame 108. The track tensioning assembly 118 comprises a jackscrew 136 having a first end attached to the axle 134 and a second end attached to the frame 108. Extending the jackscrew 136 tightens the tension within the track 104.

As shown in FIGS. 11, 13, 15, and 16, a locking assembly 142 may be supported on the frame 108 of each track assembly 102. The locking assembly 142 comprises a pair of plates 144 between which the sprocket 110 partially extends. The plates 144 are penetrated by one or more pairs of aligned holes 146 situated within the footprint of the sprocket 110. A pair of holes 146 in the plates 144 may be aligned with a space formed between a pair of adjacent projections 111 of the sprocket 110. A pin 150, preferably having an enlarged head at one end, may be inserted through the aligned holes 146 and the space between the projections 111. Thus installed, the pin 150 locks the sprocket 110 against rotation. An additional pair of aligned storage holes 152 in the plate 144 may be used for storage of the pin 150 when the sprocket 110 is unlocked. These storage holes 152 are positioned outside the footprint of the sprocket 110.

The assembled track assembly 102 is shown in FIGS. 11-14 and 17. Much as with the embodiment of FIGS. 1-10, the track 104 extends around the sprocket 110 and the rollers 112, 114, 116. The track 104 has a plurality of circumferential ridges 154 formed in an inner surface 155 of the track. A circumferential channel 156 is formed between an adjacent pair of the ridges 154. The rollers 112, 114, 116 are positioned near the ridges 154. As in the embodiment of FIGS. 1-10, the guide member 106 extends into the circumferential channel 156 to laterally stabilize the track 104. However, the guide member 106 is not a separate piece from the frame 108 in the embodiment of FIGS. 11-17.

Changes may be made in the construction, operation and arrangement of the various parts, elements, steps and procedures described herein without departing from the spirit and scope of the invention as described in the following claims.

The invention claimed is:

1. A track assembly, comprising:
   a flexible, endless track having an inner surface having a plurality of circumferential ridges in parallel relationship in which a circumferential channel is formed between an adjacent pair of circumferential ridges;
   a rotatable drive sprocket, in which the endless track is supported on the drive sprocket;
   a frame that extends at least partially within the channel of the endless track, in which the frame is a single piece; and
   a plurality of track engaging rollers supported by the frame.

2. The track assembly of claim 1 in which the plurality of track engaging rollers comprises a plurality of pairs of track engaging rollers, in which the plurality of pairs of track engaging rollers are uniformly spaced on the frame.

3. The track assembly of claim 1 further comprising a locking assembly supported by the frame, and comprising:
   a pair of plates between which the drive sprocket partially extends.

4. The track assembly of claim 3 in which the locking assembly has one or more pairs of aligned holes situated within a footprint of the drive sprocket.

5. The track assembly of claim 4 in which the locking assembly further comprises:
   a pin configured to be received within one of the pairs of aligned holes.

6. The track assembly of claim 3 in which the locking assembly is positioned between the drive sprocket and the frame.

7. The track assembly of claim 1 in which the rotational axis of the drive sprocket is spaced above the upper surface of the frame.

8. The track assembly of claim 1 in which at least one notch is formed in one of the plurality of circumferential ridges.

9. A vehicle, comprising:
   a chassis;
   an engine supported by the chassis; and
   a pair of the track assemblies of claim 1 disposed in ground-engaging relationship and supporting the chassis.

10. The track assembly of claim 9 in which the frame is supported by the chassis.

11. The track assembly of claim 1 in which the endless track is formed of rubber.

12. The track assembly of claim 1 in which the footprints of the frame and the drive sprocket overlap.

13. The track assembly of claim 1 in which at least one plane traverses both the drive sprocket and the frame.

14. The track assembly of claim 1 in which the frame has a curved lower surface adjacent each end.

15. The track assembly of claim 1 in which the endless track surrounds an interior and in which the channel opens toward that interior.

16. The track assembly of claim 1 further comprising a jackscrew attached to the frame and at least one of the plurality of track engaging rollers.

17. The track assembly of claim 1 in which the plurality of track engaging rollers are identically sized.

18. The track assembly of claim 1 in which the plurality of track engaging rollers are arranged in a pair of parallel rows and in which the frame is situated between the rows.

19. The track assembly of claim 18 in which the rotational axes of the plurality of rollers are coplanar.

20. The track assembly of claim 1 in which each of the plurality of track engaging rollers has a maximum diameter that is greater than the height of the frame.

21. The track assembly of claim 1 in which the plurality of track engaging rollers comprises a pair of first end rollers, a pair of second end rollers and one and only one pair of bogie rollers positioned between the first and second end rollers.

22. The track assembly of claim 1 in which the plurality of track engaging rollers comprises three and only three pairs of rollers.

23. The track assembly of claim 1 in which the plurality of circumferential ridges are of uniform height.

24. The track assembly of claim 1 in which the plurality of track engaging rollers comprises a pair of first end rollers and an opposed pair of second end rollers, and in which the entire lowermost edge of the frame between the first and second end rollers is at least partially positioned within the channel.

25. A track assembly, comprising:
- a flexible, endless track having an inner surface having a plurality of circumferential ridges in parallel relationship in which a circumferential channel is formed between an adjacent pair of circumferential ridges;
- a rotatable drive sprocket, in which the endless track is supported on the drive sprocket;
- a frame that extends at least partially within the channel of the endless track;
- a plurality of track engaging rollers supported by the frame; and
- a locking assembly supported by the frame, and comprising:
  - a pair of plates between which the drive sprocket partially extends.

26. A track assembly, comprising:
- a flexible, endless track having an inner surface having a plurality of circumferential ridges in parallel relationship in which a circumferential channel is formed between an adjacent pair of circumferential ridges;
- a rotatable drive sprocket, in which the endless track is supported on the drive sprocket;
- a rigid frame having a top and a bottom surface;
- a plurality of track engaging rollers supported on the frame; and
- an elongate guide member that extends at least partially within the channel of the endless track, in which the guide member is positioned at the bottom surface of the frame, and in which the frame and the guide member are a single piece.

* * * * *